(12) United States Patent
Kumagai et al.

(10) Patent No.: US 11,143,505 B2
(45) Date of Patent: Oct. 12, 2021

(54) SURVEYING INSTRUMENT

(71) Applicant: TOPCON Corporation, Tokyo-to (JP)

(72) Inventors: Kaoru Kumagai, Tokyo-to (JP); Ken-ichiro Yoshino, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 512 days.

(21) Appl. No.: 16/195,988

(22) Filed: Nov. 20, 2018

(65) Prior Publication Data
US 2019/0162853 A1  May 30, 2019

(30) Foreign Application Priority Data

Nov. 27, 2017 (JP) .............................. JP2017-226752

(51) Int. Cl.
*H04B 10/00* (2013.01)
*G01C 3/08* (2006.01)
(Continued)

(52) U.S. Cl.
CPC ............. *G01C 3/08* (2013.01); *G01C 15/002* (2013.01); *G01S 7/481* (2013.01); *G01S 7/4817* (2013.01); *G01S 17/42* (2013.01); *G01S 17/89* (2013.01); *G06T 7/30* (2017.01); *G06T 2207/10028* (2013.01)

(58) Field of Classification Search
CPC .. G01C 15/002; G01C 15/004; G01C 15/006; G01C 15/008; G01C 3/08; G01S 7/4817; G01S 17/42; G01S 7/4808; G01S 17/08; G01S 17/66; H04B 10/1123; H04B 10/1143; H04B 10/1149; H04B 10/116
USPC ....... 398/118, 119, 127, 128, 130, 129, 131, 398/135, 136, 137, 169, 170, 158, 159;
(Continued)

(56) References Cited

U.S. PATENT DOCUMENTS

2004/0207832 A1* 10/2004 Ohtomo ............... G01C 15/002
  356/4.01
2009/0268193 A1* 10/2009 Ohishi ................... G01S 17/10
  356/5.01
(Continued)

FOREIGN PATENT DOCUMENTS

EP  3226029 A1  10/2017
EP  3299846 A1  3/2018

OTHER PUBLICATIONS

European communication dated Apr. 19, 2019 in corresponding European patent application No. 18208658.7.

*Primary Examiner* — Hanh Phan
(74) *Attorney, Agent, or Firm* — Nields, Lemack & Frame, LLC

(57) ABSTRACT

A surveying instrument comprises a first measuring component having a control module and a second measuring component, wherein the control module acquires point cloud data of a whole circumference in a room with the use of the second measuring component in accordance with each installation point, makes the first measuring component to measure a predetermined position in the room, prepares outer shape data of a same height and a same shape in accordance with each installation point based on a measurement result of the first measuring component or the second measuring component, performs a shape matching of each outer shape data, and registers each point cloud data based on a movement amount and a rotation amount at the time of performing the shape matching.

7 Claims, 11 Drawing Sheets

(51) Int. Cl.
*G01S 7/481* (2006.01)
*G01S 17/42* (2006.01)
*G06T 7/30* (2017.01)
*G01C 15/00* (2006.01)
*G01S 17/89* (2020.01)

(58) Field of Classification Search
USPC ............... 356/4.01, 5.01, 3.01, 4.1, 5.1, 3.1;
33/290, 227, 281, 291, 286, 282, 278
See application file for complete search history.

(56) References Cited

U.S. PATENT DOCUMENTS

| | | |
|---|---|---|
| 2013/0004060 A1 | 1/2013 | Bell et al. |
| 2015/0160347 A1 | 6/2015 | Zweigle et al. |
| 2016/0349050 A1* | 12/2016 | Yoshino ................. G01S 17/86 |
| 2017/0123066 A1 | 5/2017 | Coddington et al. |

* cited by examiner

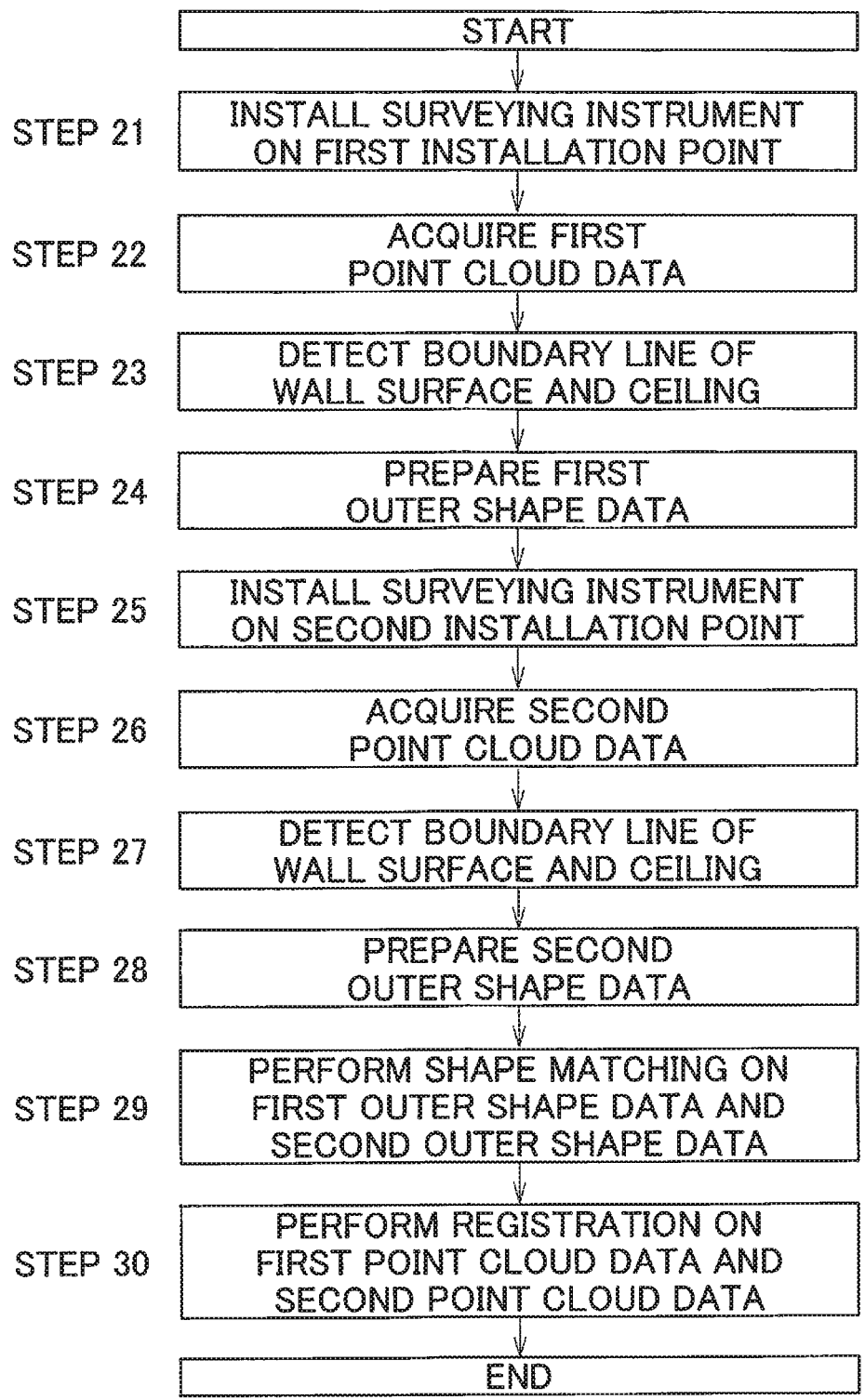

SURVEYING INSTRUMENT

BACKGROUND OF THE INVENTION

The present invention relates to a surveying instrument which can acquire a point cloud data of an object to be measured.

As a surveying instrument, there is a total station or a three-dimensional laser scanner. The total station is used for measuring a point to be measured. The three-dimensional laser scanner acquires a shape of an object to be measured as a group of innumerable points each having a three-dimensional coordinate, that is, a three-dimensional point cloud data.

When the three-dimensional point cloud data are acquired by the three-dimensional laser scanner, in particular indoor, there is a case where the three-dimensional point cloud data of an entire room cannot be acquired by the measurement performed at one point due to a shape of the room and an obstacle. In this case, when the three-dimensional point cloud data are acquired at a plurality of points and a plurality of the three-dimensional point cloud data as acquired are coupled (registered), the three-dimensional point cloud data of the entire room is acquired.

As a means for registering the plurality of the three-dimensional point cloud data, there is a method for determining the points included in the plurality of the three-dimensional point cloud data in common as the coupling points, performing the measurements at a plurality of points, matching the coupling points, and performing the registration. Further, there is also a method for acquiring a plurality of the three-dimensional point cloud data in such a manner that the common portions are included in the three-dimensional point cloud data each other, overlapping the common portions of the three-dimensional point cloud data, relatively rotating or relatively moving the three-dimensional point cloud data in accordance with each predetermined step, directly comparing the shapes, and registering the three-dimensional point cloud data in such a manner that an error of the positional displacement of the point cloud becomes minimum.

However, in case of the method for performing the registration with the use of the coupling points, an arithmetic amount for the registration is small, but the three-dimensional coordinates of the coupling points must be separately measured in addition to the measurement of the three-dimensional point cloud data. For this reason, a total station or the like for the measurement of the coupling points is additionally required, which leads to an increase in cost.

Further, in a case of the method for directly comparing the three-dimensional point cloud data and performing the registration, a surveying instrument such as a total station does not have to be used, but whether the plurality of the three-dimensional point cloud data coincide with each other is calculated every time the three-dimensional point cloud data is relatively rotated or relatively moved. For this reason, the arithmetic amount for the registration increases. Therefore, an arithmetic device used in the surveying instrument must be a high-performance type, which leads to an increase in cost.

SUMMARY OF THE INVENTION

It is an object of the present invention is to provide a surveying instrument which can register the three-dimensional point cloud data without increasing a cost.

To attain the object as described above, a surveying instrument according to the present invention is a surveying instrument which is installed in a room and performs a measurement at a plurality of installation points, wherein the surveying instrument comprises a first measuring component and a second measuring component which are provided on a frame, wherein the first measuring component comprises a horizontal rotation driving unit for horizontally rotating the frame around a vertical axis, horizontal angle detector for detecting a horizontal angle of the frame, a telescope incorporating a first distance measuring unit for sighting a predetermined measuring point, emitting the first distance measuring light, and measuring a distance, a first vertical rotation driving unit for vertically rotating the telescope around a horizontal axis, a first vertical angle detector for detecting a vertical angle of the telescope, and a control module, wherein the second measuring component comprises a second distance measuring unit for emitting the second distance measuring light which is a pulsed light and measuring a distance in accordance with each pulsed light, a scanning mirror for deflecting the second distance measuring light within a vertical plane, a second vertical rotation driving unit for vertically rotating the scanning mirror around a horizontal axis, and a second vertical angle detector for detecting a vertical angle of the scanning mirror, wherein the control module acquires point cloud data of a whole circumference in the room with the use of the second measuring component in accordance with each installation point, makes the first measuring component to measure a predetermined position in the room, prepares outer shape data of a same height and a same shape in accordance with each installation point based on a measurement result of the first measuring component or the second measuring component, performs a shape matching of each outer shape data, and registers each point cloud data based on a movement amount and a rotation amount at the time of performing the shape matching.

Further, in the surveying instrument according to a preferred embodiment, the plurality of installation points have the same height, wherein the control module controls the first measuring component in such a manner that the first distance measuring light is horizontally projected a wall surface in the room.

Further, in the surveying instrument according to a preferred embodiment, the control module controls the first measuring component in such a manner that the first measuring component measures a same reference measuring point at the plurality of installation points respectively.

Further, in the surveying instrument according to a preferred embodiment, a horizontal angle of an optical axis of the second distance measuring light is offset from a horizontal angle of an optical axis of the first measuring light in a rotating direction of the frame at a predetermined angle, wherein the control module detects a boundary between a vertical plane and a horizontal plane in the room based on precedently acquired point cloud data and controls the first measuring component in such a manner that the first measuring component measures the vertical plane which is below the boundary by a preset distance.

Further, in the surveying instrument according to a preferred embodiment, a horizontal angle of an optical axis of the second distance measuring light is offset from a horizontal angle of an optical axis of the first measuring light in a rotating direction of the frame at a predetermined angle, wherein the control module detects a boundary between a vertical plane and a horizontal plane in the room based on precedently acquired point cloud data and controls the first measuring component in such a manner that the first measuring component measures the horizontal plane on a near side which is away from the boundary by a preset distance.

Furthermore, in the surveying instrument according to a preferred embodiment, the vertical plane is a wall surface, and the horizontal plane is a ceiling.

According to the present invention, comprises: a surveying instrument which is installed in a room and performs a measurement at a plurality of installation points, wherein the surveying instrument comprises a first measuring component and a second measuring component which are provided on a frame, wherein the first measuring component comprises a horizontal rotation driving unit for horizontally rotating the frame around a vertical axis, a horizontal angle detector for detecting a horizontal angle of the frame, a telescope incorporating a first distance measuring unit for sighting a predetermined measuring point, emitting the first distance measuring light, and measuring a distance, a first vertical rotation driving unit for vertically rotating the telescope around a horizontal axis, a first vertical angle detector for detecting a vertical angle of the telescope, and a control module, wherein the second measuring component comprises a second distance measuring unit for emitting the second distance measuring light which is a pulsed light and measuring a distance in accordance with each pulsed light, a scanning mirror for deflecting the second distance measuring light within a vertical plane, a second vertical rotation driving unit for vertically rotating the scanning mirror around a horizontal axis, and a second vertical angle detector for detecting a vertical angle of the scanning mirror, wherein the control module acquires point cloud data of a whole circumference in the room with the use of the second measuring component in accordance with each installation point, makes the first measuring component to measure a predetermined position in the room, prepares outer shape data of a same height and a same shape in accordance with each installation point based on a measurement result of the first measuring component or the second measuring component, performs a shape matching of each outer shape data, and registers each point cloud data based on a movement amount and a rotation amount at the time of performing the shape matching. As a result, each of the point cloud data can be registered by the two-dimensional movement and the two-dimensional rotation alone, an arithmetic load to the control module can be reduced, the high performance of the control module does not have to be realized, and a reduction in manufacturing cost can be achieved.

BRIEF DESCRIPTION OF THE DRAWINGS

FIG. 12 is a flowchart to explain a registration processing according to the fourth embodiment of the present invention.

DETAILED DESCRIPTION OF THE PREFERRED EMBODIMENT

A description will be given below on an embodiment according to the present invention by referring to the attached drawings.

Figure 1:
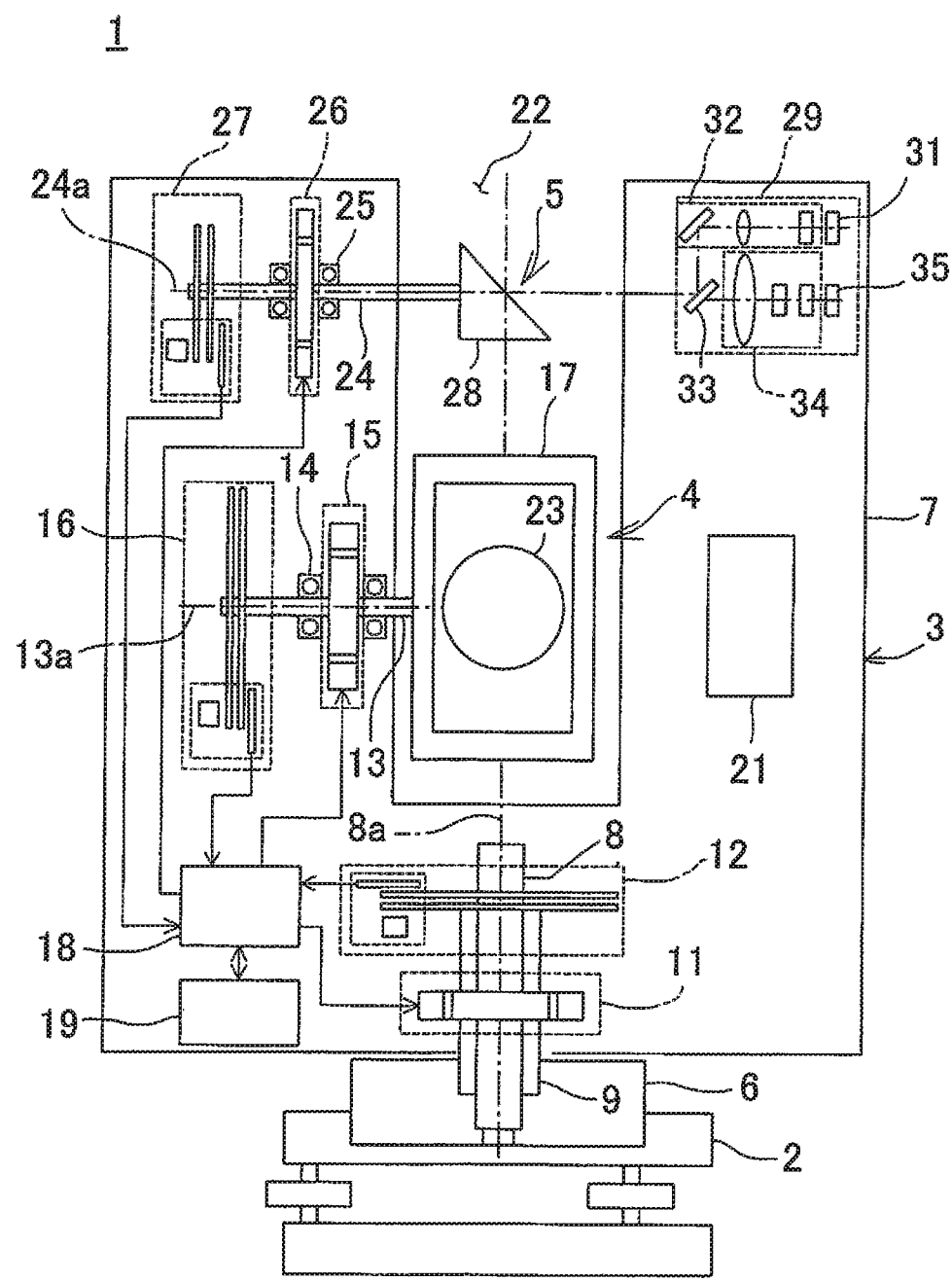
FIG. 1 is a front view showing a surveying instrument according to an embodiment of the present invention.
Figure 2:
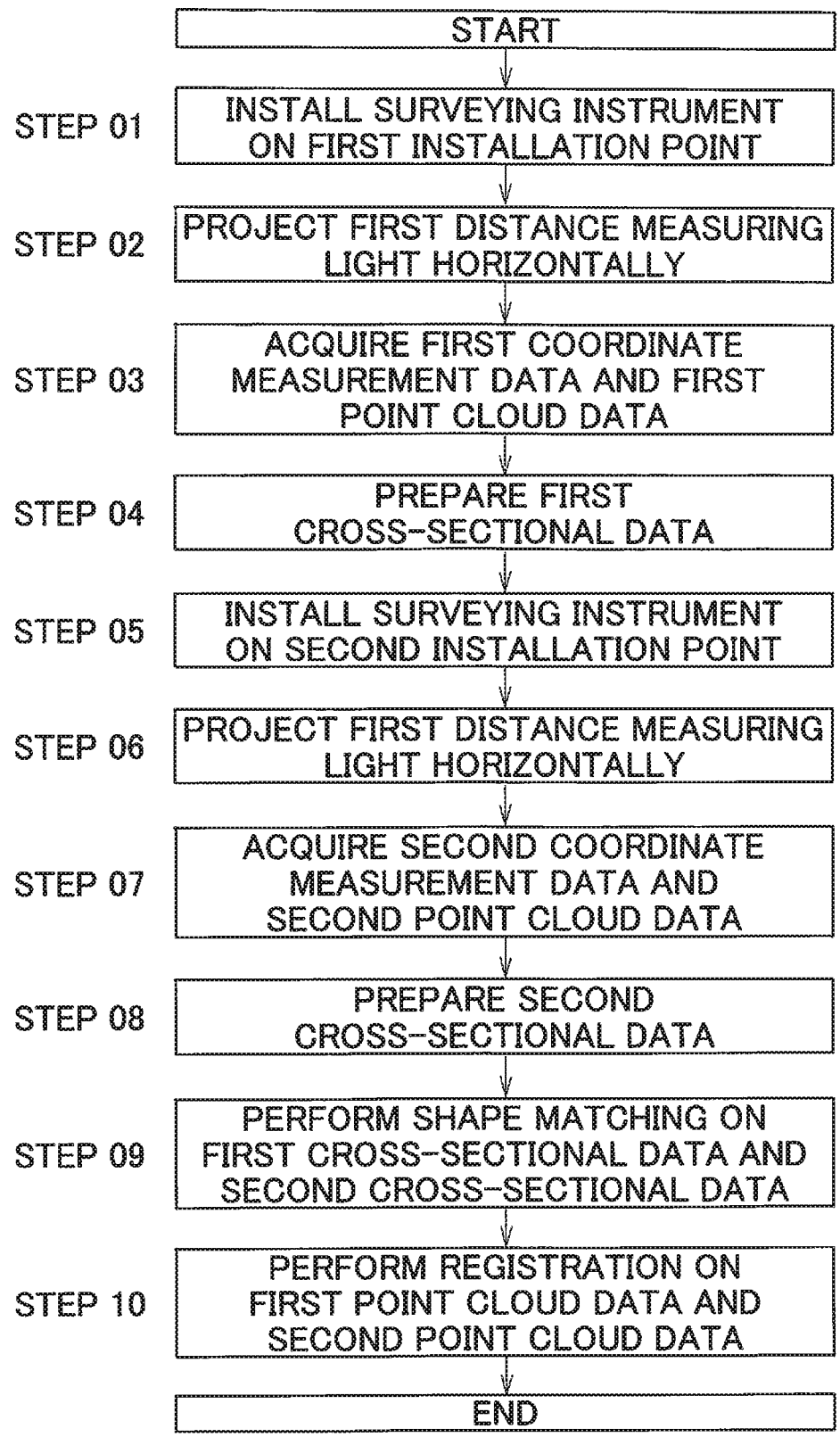
FIG. 2 is a flowchart to explain a registration processing according to a first embodiment of the present invention.

First by referring to FIG. 1, a description will be given on a surveying instrument according to a first embodiment of the present invention.

A surveying instrument 1 has a leveling unit 2 mounted on a tripod (not shown) and a surveying instrument main body 3 mounted on the leveling unit 2. The surveying instrument main body 3 has a configuration in which a total station as a first measuring component 4 and a two-dimensional laser scanner as a second measuring component 5 are integrated. It is to be noted that the leveling may be manually performed by the leveling unit 2 or may be automatically performed by a control module 18 (to be described later). The control module 18 is, for instance, a CPU, or a PC or the like may be used as the control module 18.

The first measuring component 4 comprises a fixed portion 6, a frame 7, a horizontal rotation shaft 8, a horizontal rotation bearing 9, a horizontal rotation motor 11 as a horizontal rotation driving unit, a horizontal angle encoder 12 as a horizontal angle detector, a first vertical rotation shaft 13, a first vertical rotation bearing 14, a first vertical rotation motor 15 as a first vertical rotation driving unit, a first vertical angle encoder 16 as a first vertical angle detector, a telescope 17, the control module 18, a storage module 19, an operation unit 21, and the like. The first measuring component 1 has a first measurement reference position. For instance, a point at which an optical axis of the telescope 17 (a first distance measuring optical axis) crosses an axis 13*a* of the first vertical rotation shaft 13 is assumed to be the first measurement reference position.

The horizontal rotation bearing 9 is fixed to the fixed portion 6. The horizontal rotation shaft 8 has a vertical axis 8*a*, and is rotatably supported by the horizontal rotation bearing 9. Further, the frame 7 is supported by the horizontal rotation shaft 8, and the frame 7 is configured so as to integrally rotate with the horizontal rotation shaft 8.

The horizontal rotation motor 11 is provided between the horizontal rotation bearing 9 and the frame 7, and the horizontal rotation motor 11 is controlled by the control module 18. When the control module 18 controls the horizontal rotation motor 11, the frame 7 is rotated around the horizontal rotation shaft 8 as a center.

A relative rotation angle of the frame 7 with respect to the fixed portion 6 is detected by the horizontal angle encoder 12. A detection signal from the horizontal angle encoder 12 is input to the control module 18, and horizontal angle data is calculated by the control module 18. The control module 18 performs a feedback-control with respect to the horizontal rotation motor 11 based on the horizontal angle data.

Further, on the frame 7, a recessed portion 22 is formed. The first vertical rotation shaft 13 is extended into the recessed portion 22, and the first vertical rotation shaft 13 is feely rotatable provided in the frame 7 via the first vertical rotation bearing 14.

The first vertical rotation shaft 13 has the horizontal axis 13a, and the telescope 17 is fixed to one end portion extended into the recessed portion 22. Further, on an other end portion of the first vertical rotation shaft 13, the first vertical angle encoder 16 is provided.

The first vertical rotation motor 15 is provided on the first vertical rotation shaft 13, and the first vertical rotation motor 15 is controlled by the control module 18. The control module 18 controls the first vertical rotation motor 15 so that the first vertical rotation shaft 13 rotates, and the telescope 17 is rotated around the first vertical rotation shaft 13 as the center.

An elevation angle (a vertical angle) of the telescope 17 is detected by the first vertical angle encoder 16, and a detection result is input to the control module 18. The control module 18 calculates first vertical angle data of the telescope 17 based on the detection result of the first vertical angle encoder 16, and performs the feedback-control with respect to the first vertical rotation motor 15 based on the first vertical angle data.

Further, the horizontal angle data and the first vertical angle data calculated by the control module 18 are stored in the storage module 19 in the storage module 19, various types of programs are stored. These programs include: a program for perming a distance measurement and an angle measurement of a measuring point, a program for driving the horizontal rotation motor 11, the first vertical rotation motor 15, and the second vertical rotation motor 26, a program for detecting a later-described boundary between a wall surface and a ceiling, a program for preparing cross section data at the same height in accordance with each installation position, a program for performing the shape matching of each cross section data, and a program for registering each point cloud data based on a shape matching result, and other program. The control module 18 executes various types of processing according to the present embodiment based on each of the respective program stored in the storage module 19.

As the storage module 19, various types of storage means such as an HDD, a CD, a semiconductor memory and the like are used. The storage module 19 may be attachable or/detachable with respect to the frame 7, or may be capable of sending data to an external storage device or an external data processing device via a communicating means as required.

The operation unit 21 is, for instance, a touch panel, and the settings of measuring conditions, the start and stop of the measurement, and the like can be input via the operation unit 21.

A description will be given below on the telescope 17.

The telescope 17 comprises a sighting telescope 23, and also incorporates a first distance measuring unit (not shown) as an electronic distance meter. The first distance measuring unit has a first distance measuring optical axis which is orthogonal to the axis 13a and crosses the axis 8a, a projecting unit (not shown) which projects the first distance measuring light along the first distance measuring optical axis, and a light receiving unit (not shown) which receives the reflected distance measuring light reflected by an object to be measured.

The first distance measuring unit performs the distance measurement of the object to be measured based on a time difference (that is, a round trip time of the distance measuring light) between a light emission timing of the first distance measuring light projected from the projecting unit and a light receiving timing of the reflected distance measuring light reflected on the object to be measured with respect to the light receiving unit and a light velocity. A distance measurement result, is associated with the horizontal angle data and the first vertical angle data stored in the storage module 19 as a coordinate value.

The second measuring component 5 comprises the frame 7, a second vertical rotation shaft 24, a second vertical rotation bearing 25, a second vertical rotation motor 26 as a second vertical rotation driving unit, a second vertical angle encoder 27 as a second vertical angle detector, a scanning mirror 28, a second distance measuring unit 29 as an electronic distance meter and the like. The second measuring component 5 has a second measurement reference position. The second measurement reference position is assumed to be, for instance, a point at which a distance measuring optical axis (a second distance measuring optical axis) of the second measuring component 5 crosses the axis 8a. It is to be noted that the control module 18, the storage module 19, and the operation unit 21 are also used by the second measuring component 5 in common.

A vertical axis (to be described later) of the second measuring component 5 coincides with the axis 8a of the horizontal rotation shaft 8. The second measuring component 5 is configured so as to rotate around the horizontal rotation shaft 8 integrally with the first measuring component 4.

Here, the vertical axis is extended in the vertical direction, orthogonal to an axis 24a of the second vertical rotation shaft 24, and passes through a point at which the distance measuring light is incident on the scanning mirror 28.

The second vertical rotation shaft 24 is rotatably supported by the frame 7 via the second vertical rotation bearing 25. The axis 24a of the second vertical rotation shaft 24 is horizontal, the second vertical rotation shaft 24 has one end portion extending into the recessed portion 22, and the scanning mirror 28 is fixed to the one end portion. Further, on an other end portion of the second vertical rotation shaft 24, the second vertical angle encoder 27 is provided. The second vertical rotation motor 26 rotates the second rotation shaft 24, and the scanning mirror 28 is rotated around the axis 24a as the center by the second vertical rotation shaft 24.

The axis 8a and the axis 24a are arranged to be orthogonal to each other on a reflection surface of the scanning mirror 28. It is to be noted that the axis 13a and the axis 24a are parallel to each other or offset in the horizontal direction at a predetermined angle, and a distance between the axis 13a and the axis 24a is known. That is, a second measurement reference position (a distance) of the second distance measuring unit 29 with respect to a first measurement reference position of the first distance measuring unit is known.

A rotation angle of the scanning mirror 28 is detected by the second vertical angle encoder 27, and a detection result is input to the control module 18. The control module 18 calculates second vertical angle data of the scanning mirror 28 based on the detection result, and performs a feedback-control with respect to the second vertical rotation motor 26 based on the second vertical angle data. It is to be noted that a non-illustrated high accuracy tilt sensor such as a tilt sensor is provided to the second vertical rotation shaft 24, and the control module 18 can correct an axial deviation or the like at the time of rotation based on a detection result of the tilt sensor.

A description will be given below on the second distance measuring unit 29.

The second distance measuring light which is the pulsed light is emitted from a light emitter 31 which is, for instance, a laser diode (LD), and the second distance measuring light is projected via a light projecting optical system 32 and a beam splitter 33. A second distance measuring optical axis of the second distance measuring light projected from the beam splitter 33 coincides with the axis 24a, and the second distance measuring light is deflected at a right angle by the scanning mirror 28. When the scanning mirror 28 rotates around the axis 24a as the center, the second distance measuring light becomes orthogonal to the axis 24a and rotates (scans) within a plane including the axis 8a.

The second distance measuring light reflected by the object to be measured (which will be referred to as the reflected distance measuring light) incidents on the scanning mirror 28, is deflected by the scanning mirror 28, and received by a photodetector 35 through the beam splitter 33 and a light receiving optical system 34. As the photodetector, for instance, a photo diode (PD) or an avalanche photo diode (APD) is used.

Based on a time difference between a light emission timing of the light emitter 31 and a light receiving timing of the photodetector 35 (that is, a round trip time of the pulsed light) and a light velocity, the control module 18 performs the distance measurement (Time Of Flight) for each one pulsed light of the distance measuring light. It is to be noted that, as a distance measurement method, the continuous tight or the intermittent light may be projected as the distance measuring light (and the distance measurement may be performed based on a phase difference between the projected light and the reflected light.

It is to be noted that an internal reference light optical system (not shown) is provided to the second distance measuring unit 29. A part of the second distance measuring light is divided, and the second distance measuring light as divided through the internal reference light optical system is received by the photodetector 35. By performing the distance measurement based on a time difference between a light receiving timing of the distance measuring light received by the internal reference light optical system, a light receiving timing of the reflected distance measuring light and a light velocity, the distance measurement with higher accuracy can be accomplished.

When the distance measurement is performed while rotating the scanning mirror 28 in the vertical direction, the second vertical angle data and the distance measurement data are acquired, and two-dimensional point cloud data can be acquired based on the second vertical angle data and the distance measurement data. Further, a horizontal angle at the time of acquiring the two-dimensional point cloud data is acquired by the horizontal angle encoder 12.

Further, the second vertical angle data of the scanning mirror 28 calculated by the control module 18 and the distance measurement data measured by the second distance measuring unit 29 are associated with each other, and stored in the storage module 19. Alternatively, the coordinate values represented by the distance measurement data, the second vertical angle data, and the horizontal angle data are stored in the storage module 19.

Based on the distance measurement measured by the first measuring component 4, a detection result of a vertical angle detected by the first vertical angle encoder 16, and a detection result of a horizontal angle detected by the horizontal angle encoder 12, the control module 18 measures a three-dimensional coordinate of a predetermined measuring point (a reference measuring point). Further, the control module 18 carries out the control for the acquisition of point cloud data of the second measuring component 5 as well as the control over the horizontal rotation motor. Based on the cooperation between the vertical scanning performed by the second measuring component 5 and the horizontal rotation of the horizontal rotation motor 11, the two-dimensional (two directions, that is, the horizontal and vertical directions) scanning is carried out. The two-dimensional scanning and the distance measurement for each pulsed light enable acquiring the vertical angle data of the scanning mirror 28, the horizontal angle data of the horizontal angle encoder 12, and the distance measurement data of the second distance measuring unit 29, and the three-dimensional point cloud data which corresponds to the object to be measured can be obtained. Further, the control module 18 associates the three-dimensional point cloud data with the three-dimensional coordinate of the reference measuring point measured by the first measuring component 4.

A description will be given below on an operation of the surveying instrument 1.

First, a description will be given below on a case of performing the three-dimensional measurement of a predetermined measuring point (referred to as a "reference measuring point" hereinafter) by the first measuring component 4. An information or data required for the measurement, for instance, a coordinate value of the reference measuring point is input from the operation unit 21, and the control module 18 transmits a control signal to the horizontal rotation motor 11, the first vertical rotation motor 15, and the first distance measuring unit in correspondence with the input information or data.

Based on the cooperation between the horizontal rotation of the first measuring component 4 and the vertical rotation of the telescope 17, the sighting telescope 23 is directed toward a predetermined measuring point, and the measuring point is sighted by the sighting telescope 23. The distance measuring light is projected at the measuring point via the sighting telescope 23, and the distance measurement at the measuring point is performed. The distance measurement data is input to the storage module 19, and stored in the storage module 19. Here, a mark or the like may be installed on a wall surface as a predetermined measuring point, or a characteristic position on the wall surface, for instance, a corner may be set as the measuring point.

Further, the vertical angle at the time of performing the distance measurement of the measuring point is detected by the first vertical angle encoder 16, the horizontal angle is detected by the horizontal angle encoder 12, and the first vertical angle data and the horizontal angle data are stored in the storage module 19. Further, the distance measurement data, the horizontal angle data, and the first vertical angle data are associated with each other.

The control module 18 can acquire the three-dimensional data (that is, a three-dimensional coordinate) of the measuring point based on the distance measurement data of the measuring point stored in the storage module 19 and the first vertical angle data and the horizontal angle data at the time of performing the distance measurement. Further, the control module 18 stores the Three-dimensional data of the measuring point as acquired in the storage module 19. In a case where there are a plurality of measuring points to be measured, the respective measuring points are sequentially sighted, and the measurement is repeated.

A description will be given below on a case of acquiring the three-dimensional point cloud data of an object to be measured by the second measuring component 5.

In a state where the distance measuring light is emitted from the second distance measuring unit 29, the scanning mirror 28 is rotated around the second vertical rotation shaft 24 as the center by the second vertical rotation motor 26. Further, the second measuring component 5 is horizontally rotated together with the first measuring component 4 by the horizontal rotation motor 11.

By the cooperation between the vertical rotation of the scanning mirror 28 and the horizontal rotation of the first measuring component 4, the distance measuring light is scanned in two directions, that is, the vertical direction and horizontal direction (in a two-dimensional manner).

The distance measurement is performed for each one pulsed light of the distance measuring light, and the vertical angle and the horizontal angle are detected for each one pulsed light. Based on the distance measurement data and the second vertical angle data for each one pulsed light, each two-dimensional coordinate within a vertical plane is acquired. Further, based on the two-dimensional coordinate and the horizontal angle data, the three-dimensional data at each measuring point is acquired. Further, when the distance measuring light is scanned in the two-dimensional vertical direction and horizontal direction, the three-dimensional point cloud data of the object to be measured can be acquired.

It is to be noted that a positional relationship between an origin (the first measurement reference point) of a three-dimensional coordinate system obtained by the first distance measuring unit and an origin (the second measurement reference point) of a two-dimensional coordinate system obtained by the second distance measuring unit 29 is known.

Therefore, based on the positional relationship between the first measurement reference point and the second measurement reference point, the second vertical angle data of the scanning mirror 28, and the horizontal angle data of the horizontal angle encoder 12, the control module 18 can transform a coordinate system of the second measuring component 5 into a coordinate system of the first measuring component 4. Alternatively, the control module 18 may perform the coordinate transformation based on the two-dimensional data acquired by the second measuring component 5 and the horizontal angle data acquired by the horizontal angle encoder 12 so that it can acquire each measuring point of the point cloud data as the three-dimensional data of the coordinate system of the first measuring component 4.

Further, based on a three-dimensional coordinate of the reference measuring point acquired by the first measuring component 4 and a three-dimensional coordinate of the reference measuring point in the three-dimensional point cloud data as transformed the coordinate, the control module 18 associates a measurement result of the measuring point measured by the first measuring component 4 with a measuring result of the measured by the second measuring component 5.

Referring to a flowchart of FIG. 2 and FIG. 3 to FIG. 7, a description will be given below on a registration method according to the first embodiment.

Figure 3:
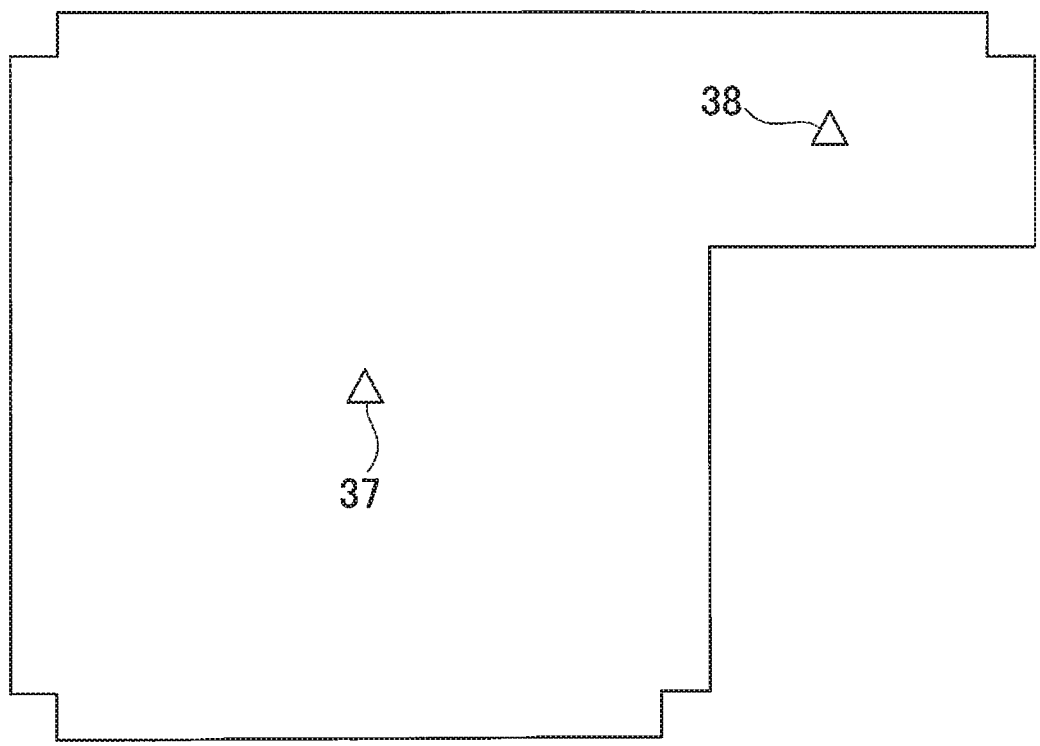
FIG. 3 is a plan view showing a room according to the first embodiment of the present invention.
Figure 4:
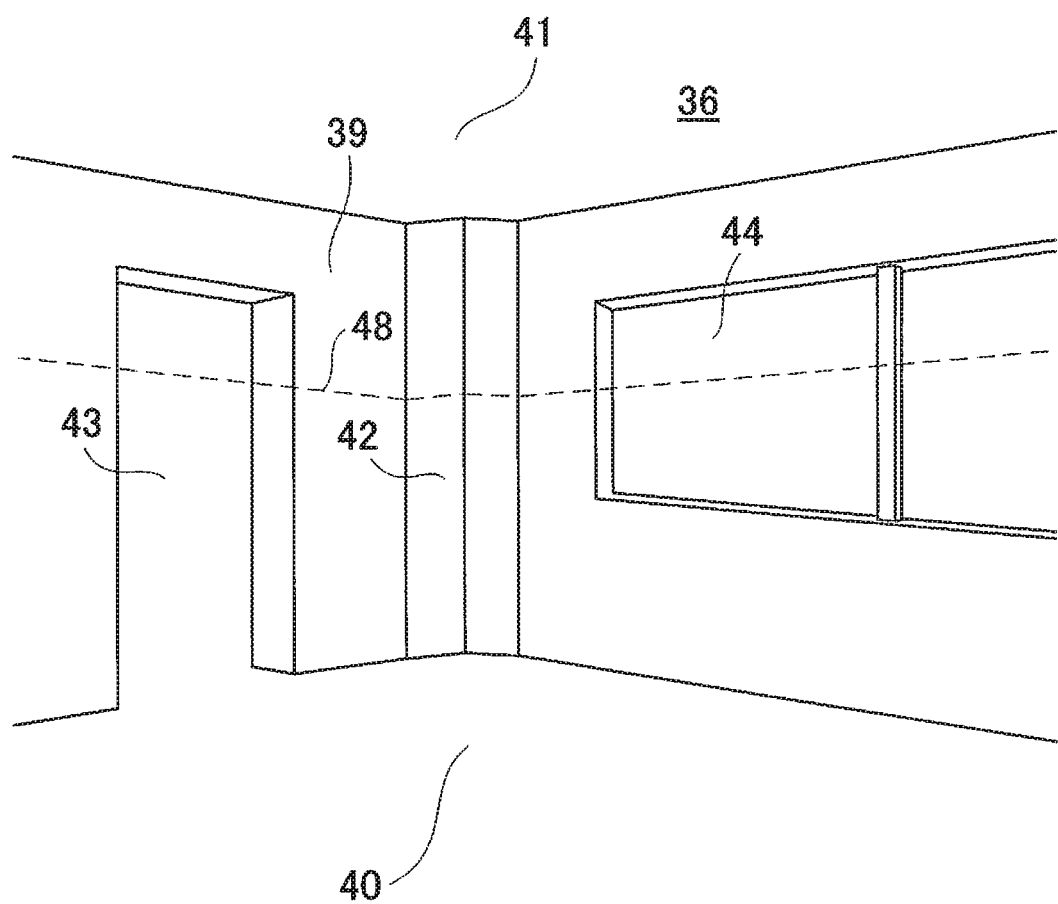
FIG. 4 is a front view showing an irradiation position of the first distance measuring light according to the first embodiment of the present invention.

In the first embodiment, a description will be given on a case of acquiring the three-dimensional point cloud data of the inside of a room when an installation surface (a floor surface 40) of the surveying instrument 1 is horizontal, a plurality of installation points of the surveying instrument 1 have the same height, and the first measurement reference point and the second measurement reference point at each installation point have the same height. FIG. 3 is a plan view showing an entire room which is a three-dimensional point cloud data acquisition object, and a reference sign 36 in the drawing denotes the room. Further, FIG. 4 is a front view showing a part of the room 36.

In FIG. 3, a reference sign 37 denotes a first installation point, and a reference sign 38 denotes a second installation point. The surveying instrument 1 is sequentially installed at the first installation point 37 and the second installation point 38, and the three-dimensional point cloud data is acquired at each of the first installation point 37 and the second installation point 38. Further, in FIG. 4, a reference sign 39 denotes a wall surface, a reference sign 40 denotes a floor surface, a reference sign 11 denotes a ceiling, a reference sign 42 denotes a post, a reference sign 43 denotes a doorway, and a reference sign 44 denotes a window.

(Step 01) First, the surveying instrument 1 is installed at the first installation point 37. Further, the control module 18 makes the leveling unit 2 to perform the leveling in such a manner that the axis 8a of the horizontal rotation shaft 8 becomes vertical. It is to be noted that an operator may manually perform the leveling of the surveying instrument 1.

(Step 02) Then, the control module 18 controls the first measuring component 4 in such a manner that the optical axis of the first distance measuring light projected from the telescope 17 becomes horizontal.

(Step 03) The control module 18 drives the horizontal rotation motor 11 and also drives the second vertical rotation motor 26. The first measuring component 4 projects the first distance measuring light in the horizontal direction. The first measuring component 4 acquires coordinate measurement (distance measurement and angle measurement) data (first coordinate measurement data) of the wall surface 39 at the intervals of a predetermined time or at a predetermined angle pitch. Further, in parallel with the first measuring component 4, the second measuring component 5 horizontally rotates the second distance measuring light while vertically rotating the same, and performs the rotatably irradiation. The second measuring component 5 acquires three-dimensional point cloud data (first point cloud data) of the room 36.

Figure 5:
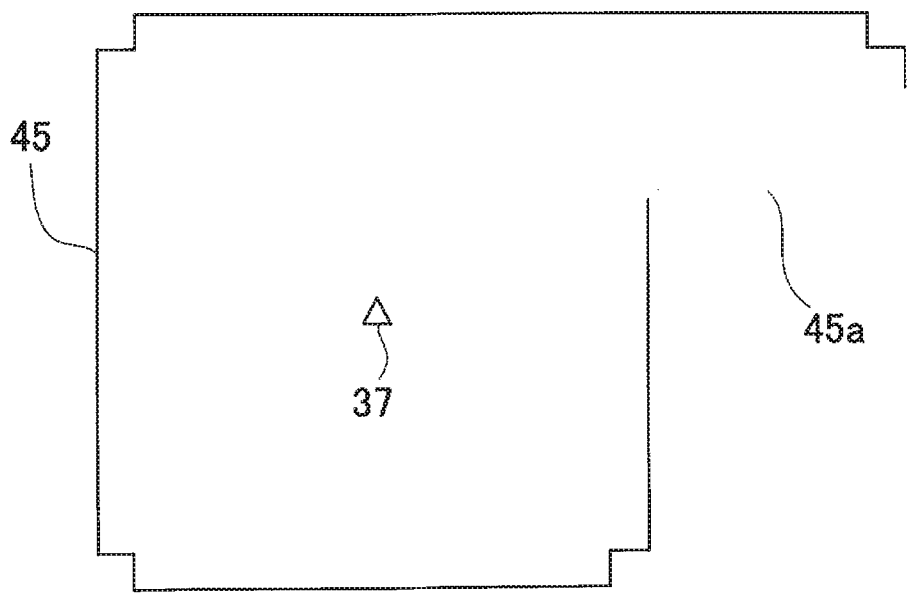
FIG. 5 is an explanatory drawing showing first cross section data acquired at a first installation point.

(Step 04) Based on a measurement result of the first distance measuring light on a locus 48 obtained from the first coordinate measurement data or based on the first point cloud data placed on the locus 48 or near the locus 48, the control module 18 prepares such first cross section data 45 as shown in FIG. 5. The first cross section data 45 is horizontal cross section data of the wall surface 39 in the room 36 at a height of the first measurement reference point measured by the first measuring component 4 at the first installation point 37.

It is to be noted that, in this embodiment, there is a position where the first distance measuring light and the second distance measuring light are occluded due to a shape of the room 36, and the entire circumference of the room 36 cannot be scanned with the first distance measuring light and the second distance measuring light. Therefore, a missing portion 45a is produced in the first cross section data 45.

(Step 05) When the first cross section data 45 is prepared, the surveying instrument 1 is then moved and installed at the second installation point 38. Further, the control module 18 makes the leveling unit 2 to perform the leveling in such a manner that the axis 8a of the horizontal rotation shaft 8 becomes vertical. It is to be noted that the operator may manually perform the leveling of the surveying instrument 1.

(Step 06) Then, the control module 18 drives the first vertical rotation motor 15 in such a manner that the first distance measuring optical axis of the first measuring component 4 becomes horizontal, and vertically rotates the telescope 17. A height of the first distance measuring optical axis at this moment is the same as a height of the first distance measuring optical axis at the first installation point 37 since the installation surface is horizontal.

(Step 07) The control module 18 drives the horizontal rotation motor 11 and the second vertical rotation motor 26, makes each of the first measuring component 4 and the second measuring component 5 to perform the measurement similar to Step 01 to Step 04 so that coordinate measurement data (second coordinate measurement data) and three-dimensional point cloud data (second point cloud data) at the second installation point 38 are acquired.

Figure 6:
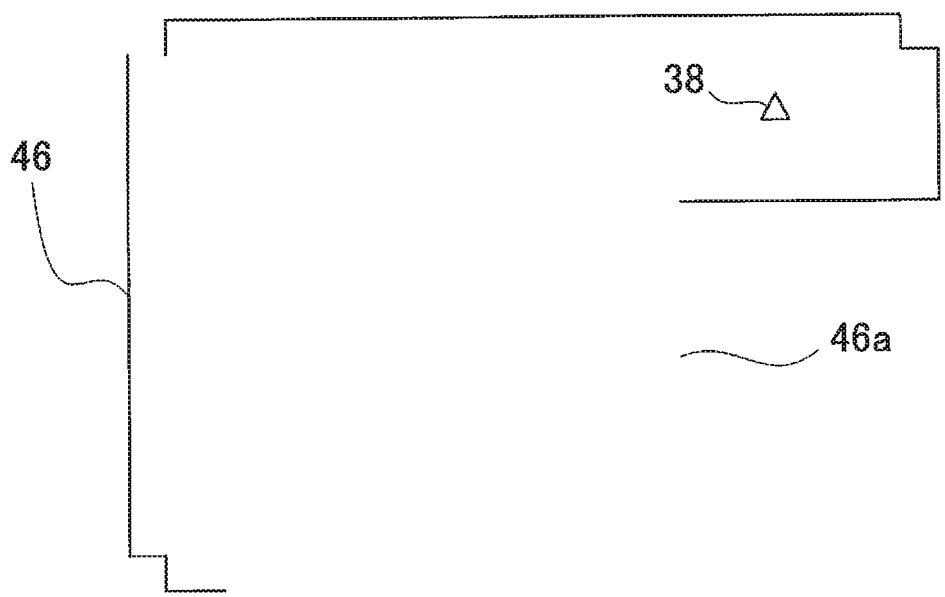
FIG. 6 is an explanatory drawing showing second cross section data acquired at a second installation point.
Figure 7:
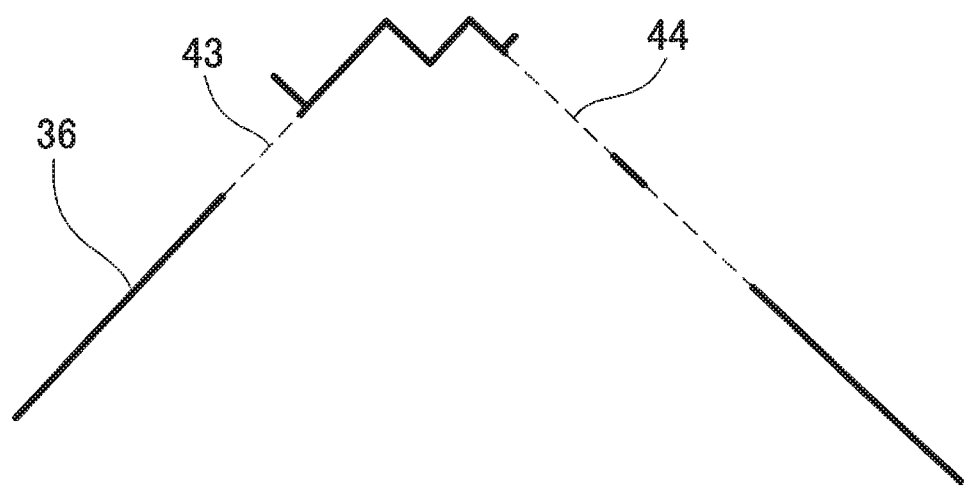
FIG. 7 is an explanatory drawing to explain a lack of the cross section data.

(Step 08) Based on a measurement result on the locus 48 obtained from the second coordinate measurement data or based on the second point cloud data placed on the locus 48 or near the locus 48, the control module 18 prepares second cross section data 46 at the second installation point 38 as shown in FIG. 6. The second cross section data 46 is horizontal cross section data of the room 36 prepared at the same height as the first cross section data 45.

It is to be noted that, in the second cross section data 46, a position where the first distance measuring light and the second distance measuring light are occluded is likewise present and, like the first cross section data 45, the entire circumference of the room 36 cannot be scanned with the first distance measuring light and the second distance measuring light. Therefore, a missing portion 46*a* is produced in the second cross section data 46. It is to be noted that the missing portion 45*a* in the first cross section data 45 is produced at a position different from the missing portion 46*a* in the second cross section data 46.

(Step 09) When the first cross section data 45 and the second cross section data 46 are prepared, the control module 18 performs the shape matching of the first cross section data 45 and the second cross section data 46.

In the first embodiment, the installation surface of the surveying instrument 1 is horizontal, and the first installation point 37 and the second installation point 38 have the same height. For this reason, a height of the measuring position of the wall surface 39 acquired in a state where the first distance measuring light rotates within a horizontal plane coincides with the first installation point 37 and the second installation point 38. Further, since the first cross section data 45 and the second cross section data 46 are the cross section data of the room 36 at the same height, they are outer shape data having the same outer shape.

Therefore, in the first embodiment, the shape matching of the first cross section data 45 and the second cross section data 46 can be performed by the movement of one of the first cross section data 45 and the second cross section data 46 along an X axis direction and a Y axis direction and the rotation of one of the first cross section data 45 and the second cross section data 46 around a Z axis as a center alone. That is, the shape matching of the first cross section data 45 and the second cross section data 46 is the two-dimensional shape matching.

By performing the shape matching of the first cross section data 45 and the second cross section data 46, the missing portion 45*a* is complemented by the second cross section data 46 and the missing portion 46*a* is complemented by the first cross section data 45.

(Step 10) At last, based on a movement amount in the X axis direction and the Y axis direction and a rotation amount around the Z axis as the center at the time of performing the shape matching of the first cross section data 45 and the second cross section data 46, the control module 18 registers (couples) the first point cloud data and the second point cloud data.

By registering of the first point cloud data and the second point cloud data, the three-dimensional pint cloud data of the entire circumference having no missing portion in the room 36 is prepared, and the registration processing is finished.

As described above, in the first embodiment, at two installation points which are horizontal and have the same height, the first measuring component 4 measures the three-dimensional coordinates of the wall surface 39 in the horizontal direction concurrently with the acquisition of the three-dimensional point cloud data by the second measuring component 5, the first cross section data 45 and the second cross section data 46 are prepared based on the three-dimensional coordinates as measured, and the shape matching of the first cross section data 45 and the second cross section data 46 is performed.

The movement amount in the X axis direction and Y axis direction and the rotation amount around the Z axis at the center in the shape matching can be directly applied as a movement amount and a rotation amount at the time of performing the registration of the first point cloud data and the second point cloud data. That is, the registration processing of the first point cloud data and the second point cloud data can be performed by the two-dimensional movement alone with the movement amount in the X axis direction and Y axis direction and the rotation amount around the Z axis as the center.

Therefore, since an arithmetic load with respect to the control module 18 is reduced, the performance of the control module 18 does not have to be improved, and a manufacturing cost can be decreased.

Further, in the first embodiment, after the acquisition of the point cloud data, since the measurement at a coupling point does not have to be performed, a measurement time can be reduced, and the workability can be improved.

It is to be noted that, in the first embodiment, the frame 7 is rotated in a state where the first distance measuring light is projected in the horizontal direction. Therefore, the first distance measuring light passes through the doorway 43 or the window 44 depending on its height in some cases. In this case, each of the first cross section data 45 and the second cross section data 46 has the missing portions in the doorway 43 and the window 44 (see FIG. 7).

However, for instance, when approximately 75% data is acquired as each of the first cross section data 45 and the second cross section data 46, the execution of the shape matching is not obstructed. Therefore, even if the missing portions are present in the data at the positions of the doorway 43 and the window 44, the first point cloud data and the second point cloud data can be registered.

Further, in the first embodiment, when the first installation point 37 and the second installation point 38 are placed on a horizontal plane and the same plane and the surveying instrument 1 is installed at the first installation point 37 and the second installation point 38, the height of the first measurement reference point (the height of the locus 48) is presumed to place the same height each other. However, there is a case where the height of the first measurement reference point does not place the same height at the first installation point 37 and the second installation point 38 due to an opened state of a tripod (not shown) and the like at the time of installing the surveying instrument 1. In this case, the first point cloud data and the second point cloud data cannot be accurately registered.

For this reason, for instance, at each installation point, the first measuring component 4 performs the measurement at an arbitrary point on the floor surface 40, a height of each first measurement reference point with respect to the floor surface 40 is measured and, for instance, a height which is used to prepare the second cross section data 46 is changed based on a difference in height. Consequently, the first cross section data 45 and the second cross section data 46 which have the same height can perform the two-dimensional shape matching in the same manner as described above, and the first point cloud data and the second point cloud data can be accurately registered.

It is to be noted that an arbitrary reference measuring point which is common to both the first installation point 37 and the second installation point 38 may be measured by the first measuring component 4, and a difference in height of the first measurement reference points at the first installation point 37 and the second installation Point 38 may be calculated based on a measurement result of the reference measurement point.

Figure 8:
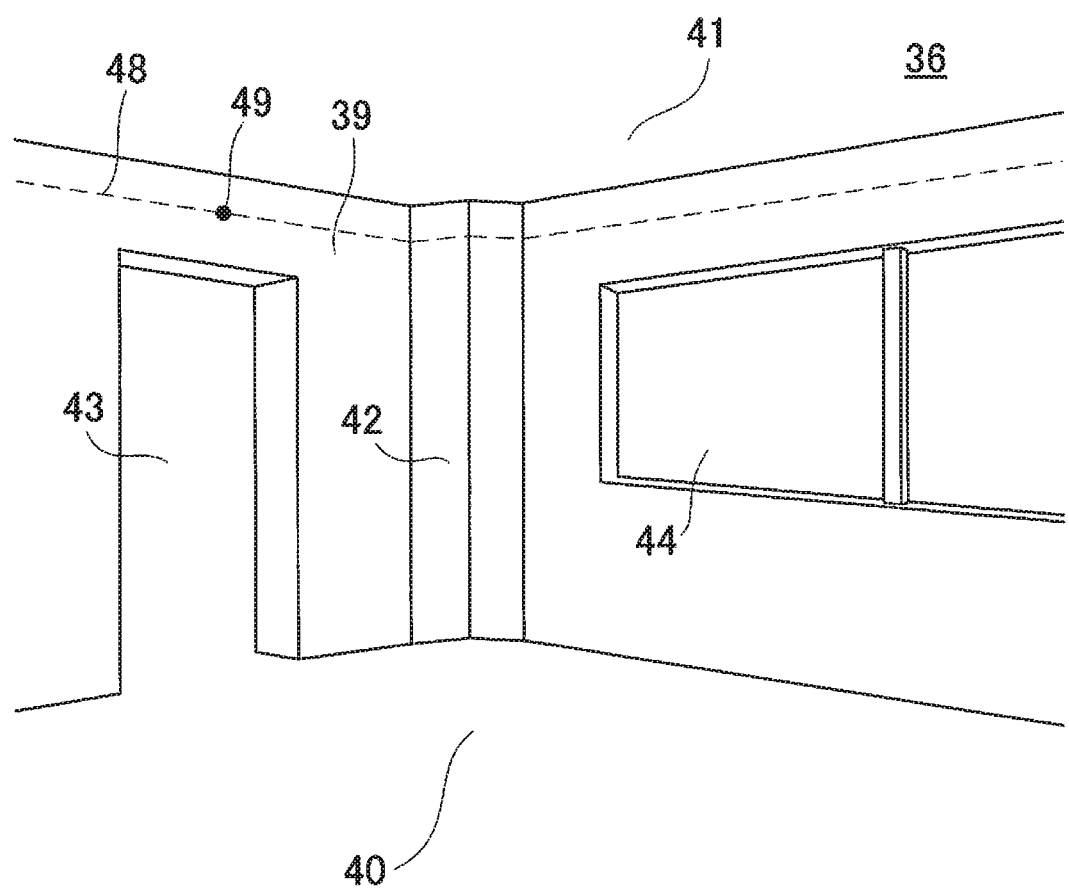
FIG. 8 is a front view showing an irradiation position of the first distance measuring light according to a second embodiment of the present invention.

Next referring to FIG. 1 and FIG. 8, a description will be given on a second embodiment of the present invention. It is to be noted that, in FIG. 8, the same components as shown in FIG. 4 are referred by the same symbols, and a detailed description thereof will be omitted.

In the second embodiment, both a first installation point 37 (see FIG. 3) and a second installation point 38 (see FIG. 3) are placed on a horizontal plane, an installation surfaces of the first installation point 37 and the second installation point 38 have the different heights, and the heights are unknown. At, the time of installing a surveying instrument 1 at the first installation point 37 and at the time of installing the surveying instrument 1 at the second installation point 38, the leveling is performed, respectively.

Further, in the second embodiment, an operation unit 21 is used to specify the same arbitrary reference measuring point 49 which can be measured from the first installation point 37 and the second installation point 38 by a first measuring component 4. An optical axis of the first distance measuring light (the first distance measuring optical axis) when the reference measuring point 49 is sighted from the first installation point 37 and the second installation point 38 is not necessarily horizontal, and the first distance measuring optical axis has a vertical angle as required. Further, a setting is configured in such a manner that a doorway 43 and a window 44 are not present on a horizontal line (a locus 48 of the first distance measuring light on a wall surface 39) passing through the reference measuring point 49.

First, at the first installation point 37, a control module 18 controls the first measuring component 4 so that a vertical angle and a horizontal angle at which the first distance measuring light can be projected the specified reference measuring point 49. The first measuring component 4 sights the reference measuring point 49, measures the reference measuring point 49, and acquires a three-dimensional coordinate of the reference measuring point 49. A height of the reference measuring point 49 with respect to the first installation point 37 can be obtained based on the three-dimensional coordinate.

Further, a surveying instrument main body 3 is rotated around the horizontal rotation shaft 8 as the center, the measurement is performed by the first measuring component 4, the measurement is performed by a second measuring component 5 at the same time, and first coordinate measurement data and first point cloud data are acquired.

In the acquisition of the first coordinate measurement data, the control module 18 controls a vertical angle of an optical axis of the first measuring component 4 in real time based on a distance measurement result in such a manner that an irradiation point of the first distance measuring light, that is, a height of a measuring point become a same height of the reference measuring point 49. Further, the first measuring component 4 performs the measurement at the predetermined time intervals with a predetermined angle pitch during the all-around rotation. Therefore, the first coordinate measurement data becomes three-dimensional data of the horizontal line on the wall surface 39 passing through the reference measuring point 49, and first cross section data 45 (see FIG. 5) at the height of the reference measuring point 49 can be obtained.

Further, as another method for acquiring the first cross section data 45, a measuring point which coincides or substantially coincides with the horizontal angle and the vertical angle of the first cross section data 45 acquired by the first measuring component 4 may be extracted from the first point cloud data, and the first cross section data 45 may be obtained.

Furthermore, as another acquiring method, the measuring points which coincide or substantially coincide with the height of the reference measuring point 49 acquired by the first measuring component 4 may be all extracted from the first point cloud data, and the first cross section data 45 may be obtained based on the extracted measuring points. In this case, the first measuring component 4 could measure the reference measuring point 49 alone, and it does not have to measure the whole circumference of the room 36.

Then, the surveying instrument 1 is moved to the second installation point 38, and second coordinate measurement, data and second point cloud data are likewise acquired at the second installation point 38. Further, second cross section data 46 (see FIG. 6) is calculated based on the second coordinate measurement data and the second point cloud data. Since the first cross section data 45 and the second cross section data 46 are cross section data at the same height in the room 36, the first cross section data 45 and the second cross section data 46 are outer shape data of the same shape.

The control module 18 performs the shape matching of the first cross section data 45 and the second cross section data 46. Further, based on a movement amount in the X axis direction and Y axis direction in the shape matching and a rotation amount in a Z axis direction at each of the first installation point 37 and the second installation point 38, the first point cloud data at the first installation point 37 and the second point cloud data at the second installation point 38 are registered (coupled).

In the second embodiment, the reference measuring point 49 at an arbitrary height which deviates from the doorway 43 and the window 44 is specified, and the first cross section data 45 and the second cross section data 46 are acquired within a horizontal plane including the reference measuring point 49. For the reason, the missing portions due to the doorway 43 and the window 44 are not produced in the first cross section data 45 and the second cross section data 46.

Therefore, an accuracy of the shape matching of the first cross section data 45 and the second cross section data 46 can be improved, and an accuracy of the registration of the first point cloud data and the second point cloud data can be improved.

Figure 9:
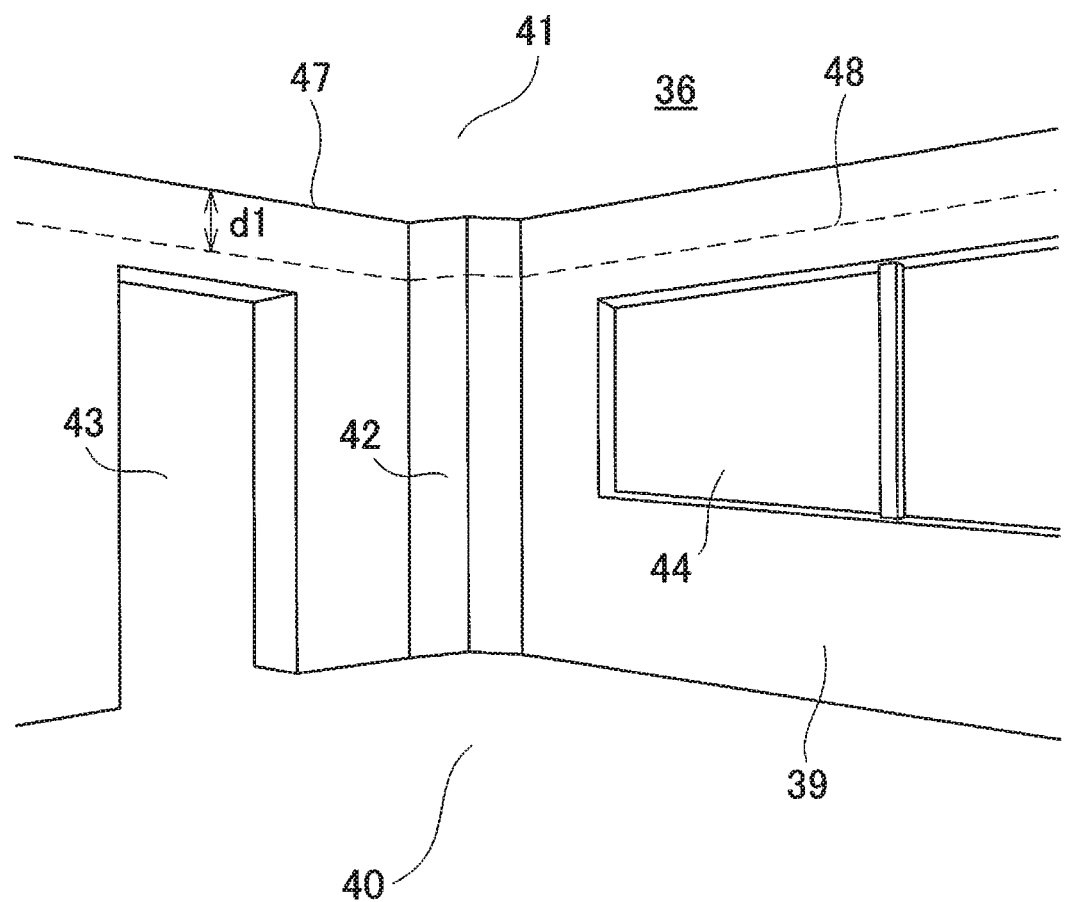
FIG. 9 is a front view showing an irradiation position of the first distance measuring light according to a third embodiment of the present invention.
Figure 10:
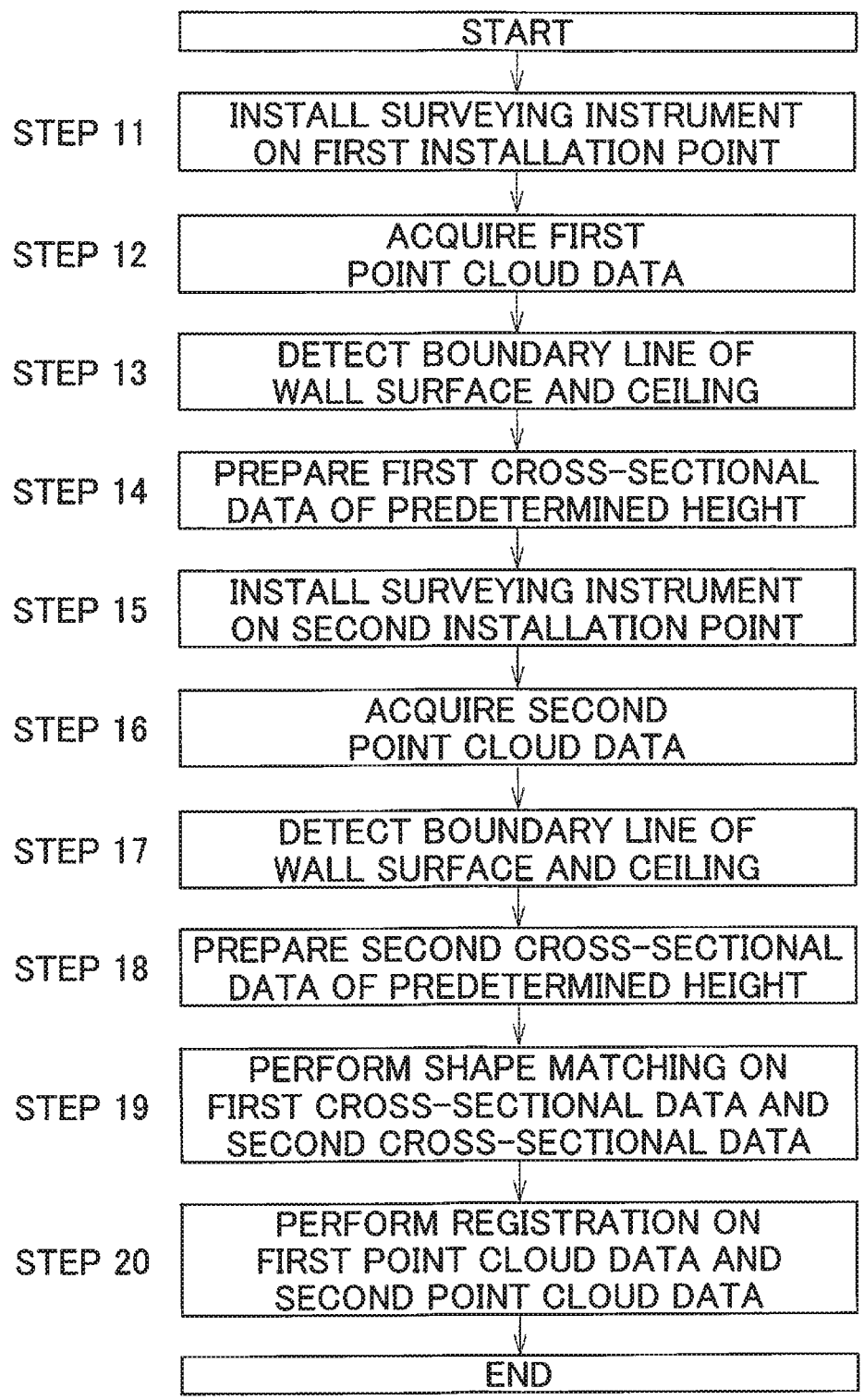
FIG. 10 is a flowchart to explain a registration processing according to the third embodiment of the present invention.

Next, referring to FIG. 1, FIG. 9, and a flowchart of FIG. 10, a description will be given on a third embodiment of the present invention. It is to be noted that, in FIG. 9, the same components as shown in FIG. 4 are referred by the same symbols, and a detailed description will thereof be omitted.

In the third embodiment, an installation surface of a first installation point 37 (see FIG. 3) and an installation surface of a second installation point 38 (see FIG. 3) are horizontal or inclined, or the two installation surfaces have the different heights. Further, a horizontal angle of a second distance measuring optical axis of a second measuring component 5 is offset from a horizontal angle of a first distance measuring optical axis of a first measuring component 4 in a rotating direction of a frame 7 at a predetermined angle, for instance, 0.6°. Therefore, the second measuring component 5 performs the rotatory irradiation (scanning) within a vertical plane which horizontally rotates at 0.6° with respect to the first distance measuring optical axis.

(Step 11) First, a surveying instrument 1 is installed at the first installation point 37. Further, the control module 18 makes a leveling unit 2 to perform the leveling in such a manner that an axis 8a of a horizontal rotation shaft 8 becomes vertical. It is to be noted that an operator may manually perform the leveling of the surveying instrument 1.

(Step 12) The control module 18 drives a horizontal rotation motor 11 and a first vertical rotation motor 15 so that first coordinate measurement data can be acquired by the first measuring component 4, and also drives a second vertical rotation motor 26 so that first point cloud data can be acquired by the second measuring component 5.

(Step 13) Here, a second distance measuring optical axis of the second measuring component 5 is offset from a first distance measuring optical axis of the first measuring component 4 in a rotating direction of the frame 7 by the predetermined angle. That is, prior to the measurement performed by the first measuring component 4, the measurement is performed by the second measuring component 5.

The control module 18 detects each position at which a value in distance data measured on the same scanning line by the second measuring component 5 changes from an increase to a decrease or from a decrease to an increase, and obtains a vertical angle of this position. This position is a boundary between a vertical plane and a horizontal plane, and the boundary is horizontal and orthogonal to the scanning line. Based on a vertical angle of the boundary and a distance measurement result, a height of the boundary with respect to a second measurement reference position of the second measuring component 5 is measured. A surveying instrument main body 3 makes an all-around rotation, and the control module 18 obtains the boundary in accordance with each scanning line and detects a boundary line 47 between a wall surface 39 and a ceiling 41.

(Step 14) The control module 18 makes the first measuring component 4 to measure a position which is below the boundary line 47 at a preset predetermined vertical angle α (a distance d1 corresponding to α). For instance, the wall surface 39 which is 10 cm below the boundary line 47 is sighted by a telescope 17, a vertical angle of the first measuring component 1 is controlled while horizontally rotating the surveying instrument main body 3 around the horizontal rotation shaft 8 as the center in such a manner that the first distance measuring optical axis horizontally moves along a position which is 10 cm below the boundary line 47, and the first measuring component 4 is allowed to perform the measurement. In FIG. 9, a reference sign 48 denotes a locus of the first distance measuring light which is parallel to the boundary line 47 and is lower than the boundary line 47 by d1.

It is to be noted that d1 is set to a height at which an opening portion such as a window 44 is not present. Further, the setting of the height may be set from design data or the like in advance, or may be set while seeing a situation on site.

Further, based on the first point cloud data as acquired and a measurement result (a height) of a measuring point placed below the boundary line 47 as detected by d1, the control module 18 prepares first cross section data 45 (see FIG. 5) on the locus 48.

(Step 15) After the preparing of the first cross section data 45, the surveying instrument 1 is moved and installed at the second installation point 38. Further, the control module 18 makes the leveling unit 2 to perform the leveling in such a manner that the axis 8a of the horizontal rotation shaft 8 becomes vertical. It is to be noted that an operator may manually perform the leveling of the surveying instrument 1.

(Step 16) The control module 18 drives the horizontal rotation motor 11 and the first vertical rotation motor 15 so that the first measuring component 4 can acquire second coordinate measurement data, and also drives the second vertical rotation motor 26 so that the second measuring component 5 can acquire second point cloud data.

(Step 17) Since the measurement using the second measuring component 5 is performed prior to the measurement using the first measuring component 4, the control module 18 detects a position at which a value of distance data measured by the second measuring component 5 changes from an increase to a decrease or from a decrease to an increase as the boundary line 47. Further, based on a vertical angle of the boundary line 47 and a distance measurement result, a height of the boundary line 47 with respect to a second measurement reference position is measured.

(Step 18) Based on the detected boundary line 47 and the preset distance d1, for instance, 10 cm, the control module 18 makes the telescope 17 to sight the wall surface 39 which is 10 cm below the boundary line 47, and makes the first measuring component 4 to perform the measurement while horizontally rotating the surveying instrument main body 3.

Further, based on the second point cloud data as acquired and a measurement result of a measuring point placed below the boundary line 47 as measured by d1, the control module 18 prepares second cross section data 46 (see FIG. 6) on the locus 48.

It is to be noted that, in the third embodiment, the height of the boundary line 47 is fixed over the entire circumference of the room 36. Therefore, the height which is below the boundary line 47 by d1 is fixed irrespective of a tilt or a height of each installation point, and the first cross section data 45 and the second cross section data 46 are cross section data of the same height. Further, since the first cross section data 45 and the second cross section data 46 are the cross section data of the same height in the room 36, the first cross section data 45 and the second cross section data 46 are outer shape data having the same outer shape.

(Step 19) After preparing the first cross section data 45 and the second cross section data 46, the control module 18 performs the shape matching of the first cross section data 45 and the second cross section data 46.

As described above, since the first cross section data 45 and the second cross section data 46 are the cross section data of the same height, the shape matching can be performed by the movement in the X axis direction and Y axis direction and the rotation around the Z axis as the center alone. That is, the shape matching of the first cross section data 45 and the second cross section data 46 are the two-dimensional shape matching.

(Step 20) At last, based on a movement amount in the X axis direction and the Y axis direction and a rotation amount around the Z axis as the center in the shape matching, the control module 18 registers the first point cloud data and the second point cloud data.

By registering of the first point cloud data and the second point cloud data, the three-dimensional point cloud data of the entire circumference having no missing portion in the room 36 is prepared, and the registration processing is finished.

In the third embodiment, the measurement by the second measuring component 5 is performed prior to the measurement by the first measuring component 4, and the control module 18 determines a measuring position (a measuring height) of the first measuring component 4 based on a height of the boundary line 47 detected from a measurement result of the second measuring component 5 and the preset distance d1.

Therefore, since the measuring position of the first measuring component 4 is automatically determined and an operator does not have to specify the measuring position of the first measuring component 4, the number of operations can be reduced, and the workability can be improved.

It is to be noted that, in the third embodiment, a horizontal angle of the second distance measuring optical axis of the second measuring component 5 is offset from a horizontal angle of the first distance measuring optical axis of the first measuring component 4 in a rotating direction of the frame 7 at a predetermined angle. However, like the first embodiment, the horizontal angle of the first distance measuring optical axis may be set to coincide with the horizontal angel of the second distance measuring optical axis.

In this case, the second measuring component 5 alone may be driven, the three-dimensional point cloud data of the entire circumference of the room, 36 may be acquired, then the boundary line 47 may be detected based on the three-dimensional point cloud data, an arbitrary measuring point which is placed below the boundary line 47 by d1 may be measured by the first measuring component 4, and the cross section data may be prepared from the point cloud data based on a measurement result.

Further, in the third embodiment, the surveying instrument 1 is leveled up at the first installation point 37 and the second installation point 38 respectively, but the leveling operation may be omitted when the boundary line 47 is horizontal.

Since the boundary line 47 can be detected from the point cloud data acquired by the second measuring component 5, a tilt of the axis 8a with respect to the boundary line 47, that is, a tilt of the surveying instrument 1 with respect to the horizontality can be obtained. Therefore, even if each coordinate measurement data or the point cloud data is acquired in a state where the surveying instrument 1 is not leveled up, the control module 18 can correct the point cloud data based on the tilt of the surveying instrument 1. Further, the control module 18 can prepare the cross section data based on the point cloud data as corrected. That is, since the leveling operation of the surveying instrument 1 can be omitted, the surveying instrument 1 could be roughly installed, and the number of operations can be further reduced.

It is to be noted that, when each installation point is tilted and the leveling operation of the surveying instrument 1 is omitted, the first measuring component 4 horizontally rotates while changing a vertical angle, measures a point on the locus 48, and acquires the coordinate measurement data. Alternatively, the second measuring component 5 may acquire the point cloud data and correct the point cloud data based on a tilt of the surveying instrument 1, and then an arbitrary point which is placed below the boundary line 47 by d1 may be measured by the first measuring component 4 so that the coordinate measurement data can be acquired.

Further, in the third embodiment, although a boundary between the wall surface 39 and the ceiling 41 is detected as the boundary line 47, a boundary between the wall surface 39 and a floor surface 40 may be detected as the boundary line 47.

Figure 11:
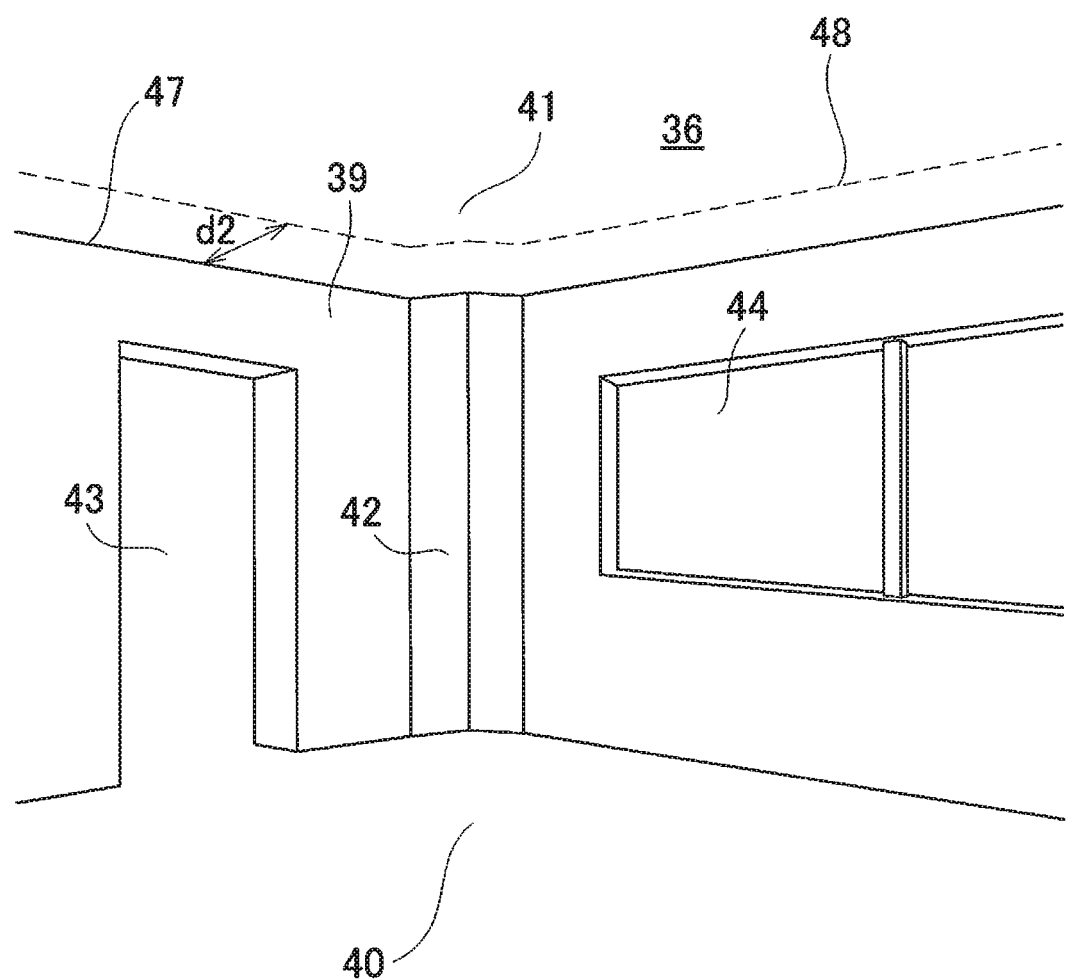
FIG. 11 is a front view showing an irradiation position of the first distance measuring light according to a fourth embodiment of the present invention.

Next referring to FIG. 1, FIG. 11, and a flowchart of FIG. 12, a description will be given on a fourth embodiment of the present invention. It is to be noted that, in FIG. 11, the same components as shown in FIG. 4 are referred by the same symbols, and a detailed description will thereof be omitted.

In the fourth embodiment, like the third embodiment, an installation surface of a first installation point 37 (see FIG. 3) and an installation surface of a second installation point 38 (see FIG. 3) are horizontal or tilted, and the two installation surfaces have the different heights. Further, a ceiling 41 is a horizontal plane. Further, a horizontal angle of a second distance measuring axis of a second measuring component 5 is offset from a horizontal angle of a first distance measuring optical axis of a first measuring component 4 in a rotating direction of a frame 7 at a predetermined angle, for instance, 0.6°. Therefore, the second measuring component 5 rotationally irradiates (scans) a vertical plane which is rotated with respect to the first distance measuring optical axis in the horizontal direction at 0.6°.

(Step 21) First, a surveying instrument 1 is installed at the first installation point 37. Further, a control module 18 makes a leveling unit 2 to perform the leveling in such a manner that an axis 8a of a horizontal rotation shaft 8 becomes vertical. It is to be noted that an operator may manually perform the leveling of the surveying instrument 1.

(Step 22) The control module 18 drives a horizontal rotation motor 11 and a first vertical rotation motor 15 so that the first measuring component 4 can acquire first coordinate measurement data, and drives a second vertical rotation motor 26 so that the second measuring component 5 can acquire first point cloud data.

(Step 23) Here, a second distance measuring optical axis of the second measuring component 5 is offset from a first distance measuring optical axis of the first measuring component 4 in the rotating direction of the frame 7 by the predetermined angle. That is, prior to the measurement performed by the first measuring component 4, the measurement is performed by the second measuring component 5. Based on the same procedure as Step 13 in the third embodiment, the control module 18 detects a boundary line 47 between a wall surface 39 and a ceiling 41.

(Step 24) The control module 18 allows the first measuring component 4 to measure a position on a near side which is away from the boundary line 47 by a preset vertical angle α (a distance d2 corresponding to α). For instance, a telescope 17 is sighted to the ceiling 41 on the near side which is 10 cm away from the boundary line 47, a vertical angle of the first measuring component 4 is controlled while rotating the surveying instrument main body 3 around the horizontal rotation shaft 8 as the center in the horizontal direction in such a manner that a first distance measuring optical axis horizontally moves on the near side which is 10 cm from the boundary line 47, and the first measuring component 4 is made to performed the measurement. In FIG. 11, a reference sign 48 denotes a locus of the first distance measuring light placed on the near side which is parallel to the boundary line 47 and is away from the boundary line 17 by d2. It is to be noted that d2 may be set based on design data or the like in advance, or d2 may be set while seeing a situation on site.

Further, based on the first point cloud data as acquired and a measurement result of the measuring point as detected placed on the near side which is away from the boundary line 47 by d2, the control module 18 prepares first outer shape data (not shown) which is parallel to the locus 48. The first outer shape data has a shape which is formed of the boundary line 47, smaller than, and similar to an outer shape of the ceiling 41.

(Step 25) After preparing the first outer shape data, the surveying instrument 1 is moved and installed at the second installation point 38. Further, the control module 18 makes the leveling unit 2 to perform the leveling in such a manner the axis 8a of the horizontal rotation shaft 8 becomes vertical. It is to be noted that an operator may manually perform the leveling of the surveying instrument 1.

(Step 26) The control module 18 drives the horizontal rotation motor 11 and the first vertical rotation motor 13 so that the first measuring component 4 can acquire second coordinate measurement data, and drives the second vertical rotation motor 26 so that the second measuring component 5 can acquire second point cloud data.

(Step 27) The measurement by the second measuring component 5 is performed prior to the measurement by the first measuring component 4. The control module 18 detects the boundary line 47 between the wall surface 39 and the ceiling 41 by using the same procedure as Step 17 in the third embodiment.

(Step 28) Based on the boundary line 47 as detected and the preset distance d2, for instance, 10 cm, the control module 18 makes the telescope 17 to sight the ceiling 41 on the near side which is 10 cm from the boundary line 47. Further, the control module 18 controls a vertical angle of the first measuring component 4 and makes the first measuring component 4 to perform the measurement while horizontally rotating the surveying instrument main body 3 in such a manner that the first distance measuring optical axis horizontally moves on the near side which is 10 cm from the boundary line 47.

Further, based on the second point cloud data as acquired and a measurement result of the measuring point as measured placed on the near side which is away from the boundary line 47 by d2, the control module 18 prepares second outer shape data which is parallel to the locus 48 (not shown).

It is to be noted that the same boundary line 47 is detected at the first installation point 37 and the second installation point 38. Therefore, the first outer shape data and the second outer shape data are data of the same height and the same shape.

(Step 29) After preparing the first outer shape data and the second outer shape data, the control module 18 performs the shape matching of the first outer shape data and the second outer shape data.

As described above, since the first outer shape data and the second outer shape data are the outer shape data of the same height and the same shape, the shape matching can be performed by the movement in the X axis direction and Y axis direction and the rotation around the Z axis as the center alone. That is, the shape matching of the first outer shape data and the second outer shape data is the two-dimensional shape matching.

(Step 30) At last, based on a movement amount in the X axis direction and the Y axis direction and a rotation amount around the Z axis as the center at the time of performing the shape matching, the control module 18 registers the first point cloud data and the second point cloud data.

In the fourth embodiment, likewise, based on the boundary line 47 detected from the point cloud data, a measuring position of the first measuring component 4 can be automatically determined by the control module 18. Therefore, since an operator does not have to specify a measuring position of the first measuring component 4, the number of operations can be reduced, and the workability can be improved.

It is to be noted that, in the fourth embodiment, although a horizontal angle of the second distance measuring optical axis of the second measuring component 5 is offset from a horizontal angle of the first distance measuring optical axis of the first measuring component 4 in a rotating direction of the frame 7 at a predetermined angle, similar to the first embodiment, the horizontal angle of the first distance measuring optical axis may be set to coincide with the horizontal angle of the second distance measuring optical axis.

Further, similar to the third embodiment, it is needless to say that a boundary between the wall surface 39 and a floor surface 40 may be detected as the boundary line 47.

It is to be noted that, in the first embodiment to the fourth embodiment, after preparing the first cross section data 45 or the first outer shape data at the first installation point 37, the surveying instrument 1 is moved to the second installation point 38, and the second cross section data 46 or the second outer shape data is prepared, but the surveying instrument 1 may be installed at each of the first installation point 37 and the second installation point 38, may be prepared the first cross section data 45 and the second cross section data 46 or the first outer shape data and the second outer shape data.

Further, in the first embodiment to the fourth, embodiment, the surveying instrument 1 is installed at two positions. On the other hand, it is needless to say that, even if the surveying instrument is installed at three or more positions, each point cloud data can be registered by the two-dimensional movement and the rotation alone.

The invention claimed is:

1. A surveying instrument which is installed in a room and performs a measurement at a plurality of installation points, wherein said surveying instrument comprises a first measuring component and a second measuring component which are provided on a frame, wherein said first measuring component comprises a horizontal rotation driving unit for horizontally rotating said frame around a vertical axis, a horizontal angle detector for detecting a horizontal angle of said frame, a telescope incorporating a first distance measuring unit for sighting predetermined measuring point, emitting said first distance measuring light, and measuring a distance, a first vertical rotation driving unit for vertically rotating said telescope around a horizontal axis, a first vertical angle detector for detecting a vertical angle of said telescope, and a control module, wherein said second measuring component comprises a second distance measuring unit for emitting said second distance measuring light which is a pulsed light and measuring a distance in accordance with each pulsed light, a scanning mirror for deflecting said second distance measuring light within a vertical plane, a second vertical rotation driving unit for vertically rotating said scanning mirror around a horizontal axis, and a second vertical angle detector for detecting a vertical angle of said scanning mirror, wherein said control module acquires point cloud data of a whole circumference in said room with the use of said second measuring component in accordance with each installation point, makes said first measuring component to measure a predetermined position in said room, prepares outer shape data of a same height and a same shape in accordance with each installation point based on a measurement result of said first measuring component or said second measuring component, performs a shape matching of each outer shape data, and registers each point cloud data based on a movement amount and a rotation amount at the time of performing the shape matching.

2. The surveying instrument according to claim 1, wherein said plurality of installation points have said same height, wherein said control module controls said first measuring component in such a manner that said first distance measuring light is horizontally projected a wall surface in the room.

3. The surveying instrument according to claim 1, wherein said control module controls said first measuring component in such a manner that said first measuring component measures a same reference measuring point at said plurality of installation points respectively.

4. The surveying instrument according to claim 1, wherein a horizontal angle of an optical axis of said second distance measuring light is offset from a horizontal angle of an optical axis of said first measuring light in a rotating direction of said frame at a predetermined angle, wherein said control module detects a boundary between a vertical plane and a horizontal plane in said room based on precedently acquired point cloud data and controls said first measuring component in such a manner that said first measuring component measures said vertical plane which is below said boundary by a preset distance.

5. The surveying instrument according to claim 4, wherein said vertical plane is a wall surface, and said horizontal plane is a ceiling.

6. The surveying instrument according to claim 1, wherein a horizontal angle of an optical axis of said second distance measuring light is offset from a horizontal angle of an optical axis of said first measuring light in a rotating direction of said frame at a predetermined angle, wherein said control module detects a boundary between a vertical plane and a horizontal plane in said room based on precedently acquired point cloud data and controls said first measuring component in such a manner that said first measuring component measures said horizontal plane on a near side which is away from the boundary by a preset distance.

7. The surveying instrument according to claim 6, wherein said vertical plane is a wall surface, and said horizontal plane is a ceiling.

\* \* \* \* \*